Jan. 2, 1968

T. J. SHERRILL, JR  3,361,024

CHARGE METERING MEANS FOR SHELL LOADER

Filed Nov. 30, 1966  3 Sheets-Sheet 1

INVENTOR.
TROY J. SHERRILL, JR.
BY
Denee & Stetz
ATTORNEYS

INVENTOR.
TROY J. SHERRILL, JR.
BY Renee & Stutz
ATTORNEYS

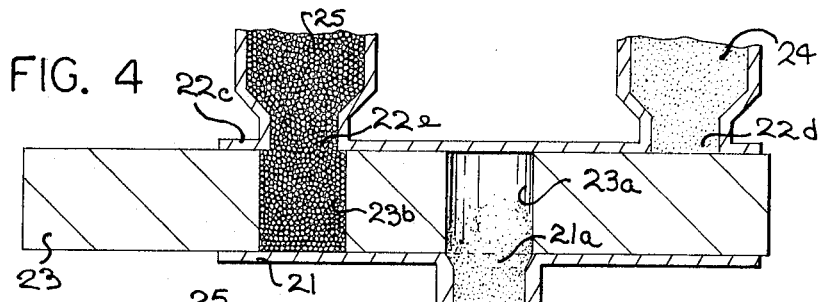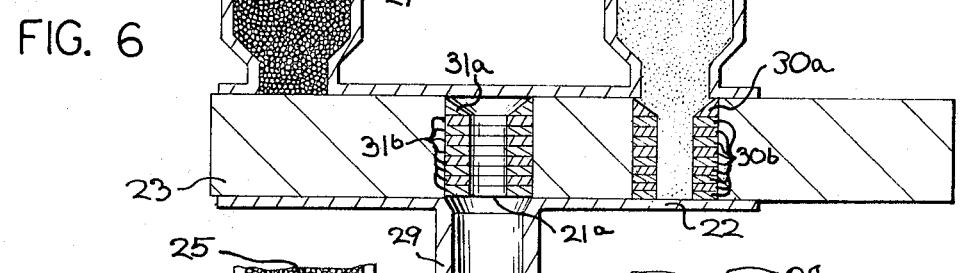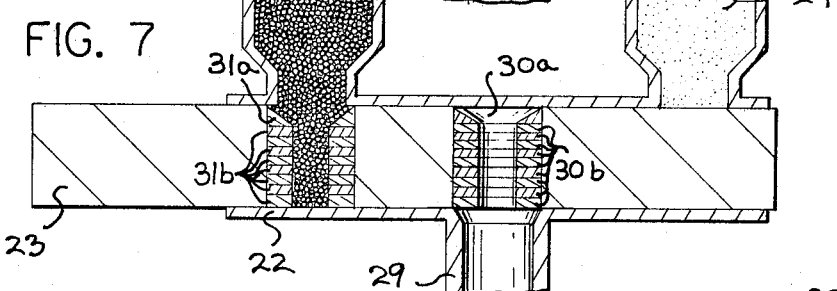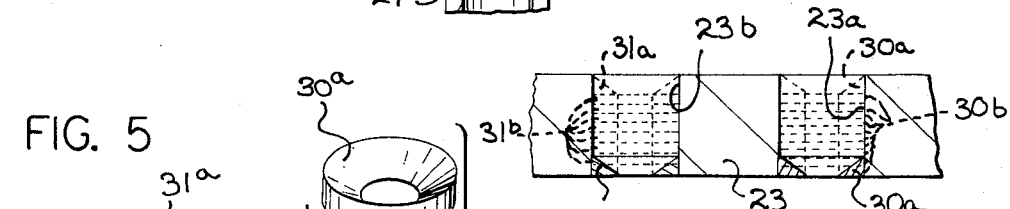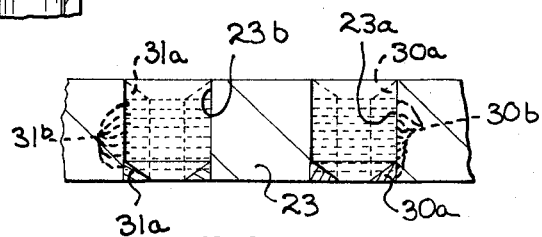

3,361,024
CHARGE METERING MEANS FOR
SHELL LOADER
Troy J. Sherrill, Jr., R.R. 2, Chambersburg, Pa. 17201
Filed Nov. 30, 1966, Ser. No. 597,978
15 Claims. (Cl. 86—33)

ABSTRACT OF THE DISCLOSURE

Charge metering means comprising one or more sets of charge metering elements for use in conjunction with a hollow charge measuring chamber of the type associated with devices for loading or reloading charges in cartridge shells. Each of the charge metering elements when inserted within the charge measuring chamber function to displace a predetermined volume of charge corresponding to a fixed predetermined incremental portion of the volumetric charge measuring capacity of the charge measuring chamber. The shape of the charge metering elements is such that they will snugly nest in axially stacked array within the charge measuring chamber to provide precisely measured charges which may be incrementally varied in fixed predetermined amounts according to the requirements or desires of the user.

---

Figure 1:
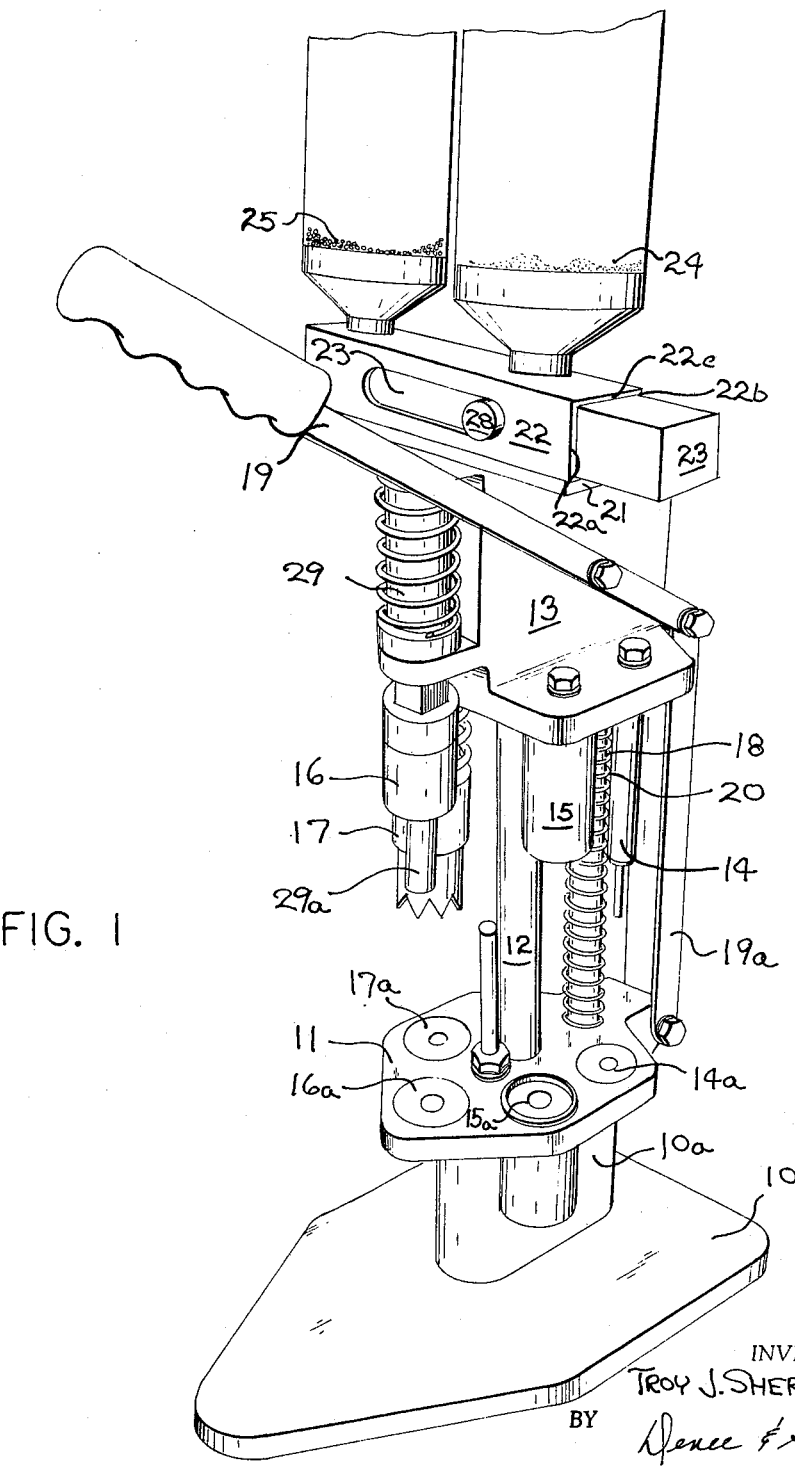

The present invention pertains in general aspects to charge metering devices such as are utilized in conjunction with the loading of shells and cartridges, and like types of ammunition used in association with various types of firearms.

In more particular additional respects, the subject invention is especially adapted for use in conjunction with loading and/or reloading devices of the type commonly used for loading a shell or cartridge with a charge of powder and/or shot and wherein it is desirable that provision be made for accommodating precisely metered variations in the amount of powder and/or shot as may from time to time be desired.

Heretofore, it has been common practice to provide loading and/or reloading devices, of the type referred to above, with several interchangeable charge measuring or metering units which individually serve to meter and deliver a precise amount of charge to each shell or cartridge. Such units are customarily referred to in the art as "charging bars." The use of such charging bars is quite common and the construction, although well-known in the art, is such that they are provided with one or more transverse bores. Additionally, the charging bar is ordinarily shiftably mounted in the loading or reloading device so that the bore or bores may be shifted into oriented registry with the delivery end of a powder and/or shot storage chamber or hopper device. The bores, of course, are of such predetermined size as to accommodate a precise predetermined volumetric amount of charge and/or shot. Customarily, loading and/or reloading devices particularly designed for the loading of shot gun shells and cartridges include one storage chamber for powder and a separate storage chamber for shot. In such devices, the charging bar is accordingly customarily provided with a pair of bores respectively providing different volumetric capacities; whereby one bore is shiftable into registry with the powder storage chamber to accommodate and meter a predetermined charge of powder and the other bore is sequentially shiftable into registry with the shot storage chamber to accommodate and meter a predetermined charge of shot.

Although such charging bars afford a means of metering and delivering precise volumetric amounts of charge and shot, the fixed volumetric capacity of the bores in the charging bar presents a considerable problem with respect to accommodating variation in the amount of charge to meet the different requirements or needs of the marksman or hunter using the same. In an attempt to rectify this problem, many of such loading and/or reloading devices are constructed to accommodate and be provided with numerous interchangeable charging bars designed to individually provide a measuring chamber having a volumetric capacity incrementally varying from that of each of the other respective interchangeable charging bars. Such devices are particularly unsuitable for use by marksmen, hunters and others who are desirous of enjoying the benefits of the convenience, inexpense and marksmanship obtainable with self-loading of such shells and cartridges or the reloading thereof. Exemplary of the expense involved, some well-known types of shell or cartridge loading and reloading devices require a separate and distinct charging bar for each combination of shot and powder which is desired, and in this regard one well-known and widely used loading device provides over ninety interchangeable charging bars at a cost of several dollars for each such interchangeable charging bar. Another well-known and widely used loading and reloading device, although necessitating only one charging bar, requires the use of over thirty different size accessory bushings, which are interchangeably insertable in the measuring chamber of the charging bar, in order to accommodate an adequate range of variability of charge.

Keeping the foregoing in mind, it is therefore a principal objective of the present invention to provide means in the form of a single and economical construction for use in combination with conventional charging bar types of charge metering or measuring devices whereby to precisely meter or measure predetermined incrementally variable charges of powder or shot throughout a wide range of variation and to this end providing a plurality of annular disks arranged to individually nest within the confines of the powder and/or shot measuring chamber of a powder and/or shot charging bar; each of said annular disks being adapted to vary the volumetric measuring capacity of said measuring chamber by a predetermined incremental amount.

Another objective of the present invention is to accomplish the foregoing objective in such manner that the volumetric capacity of said charge metering chamber may be selectively and incrementally varied throughout a range of measurement ample to accommodate optimum usage of said charge metering chamber.

Another objective of the present invention is to provide means of the character described in the first-mentioned objective and also having the characteristics of being capable of varying the powder metering chamber by increments correlated to correspond to precise predetermined increments of powder.

Another objective of the present invention is to provide means of the character described in the first-mentioned objective and also having the characteristics of being capable of varying the shot metering chamber by increments correlated to correspond to precise predetermined increments of shot.

Another particular objective of the present invention is to provide, for use in conjunction with a shell loading device having a charging chamber of fixed volumetric capacity, a plurality of thin annular inserts shaped to nest concentrically and in interchangeable number within the interior confines of said chamber.

Figure 2:
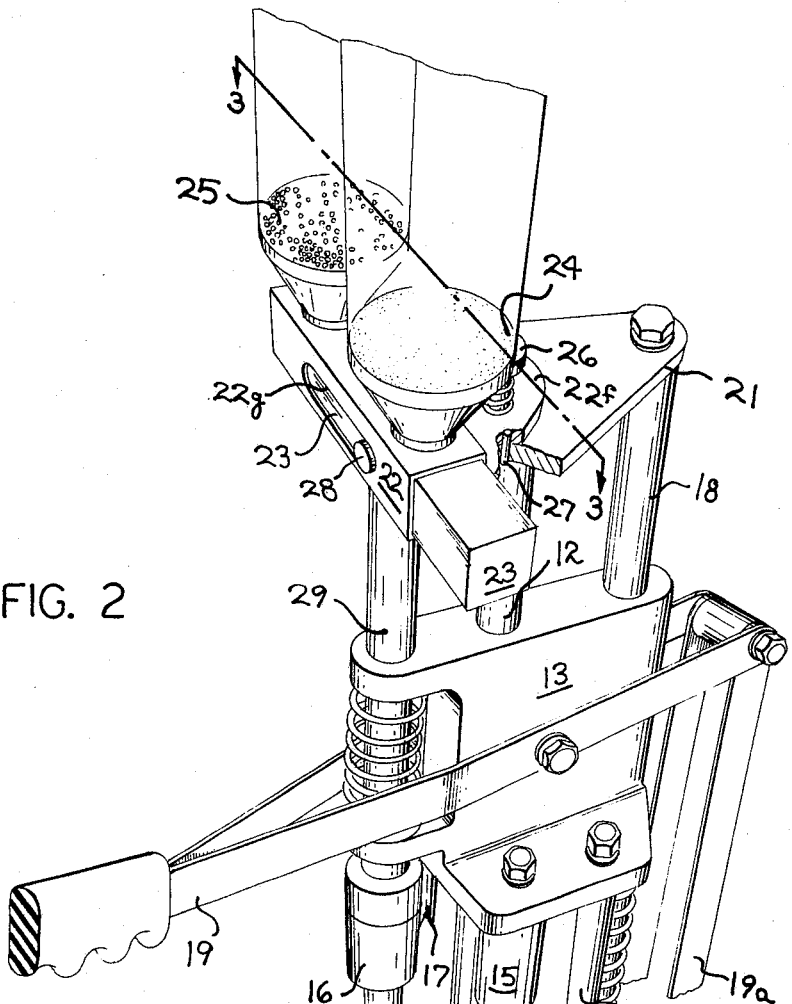
Figure 3:
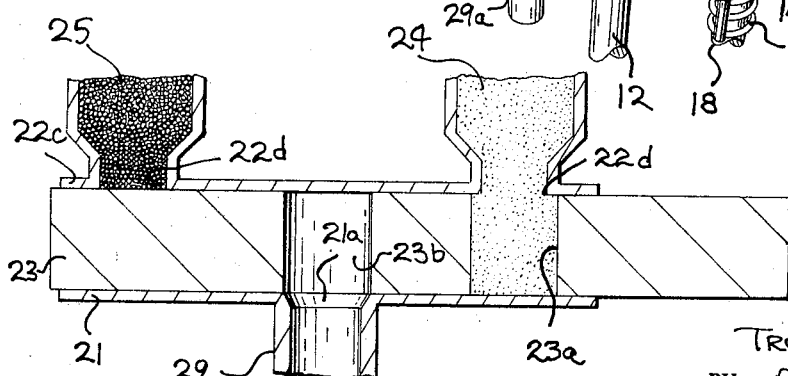

Other objects and advantages of the present invention, as well as the specific nature thereof, will, of course, become readily apparent to those skilled in the art upon the basis of the following detailed description taken in conjunction with the annexed sheets of drawings on which, by way of example only, a preferred embodiment of this invention is illustrated, and whereon:

FIG. 1 is an elevational perspective view of one form of shell loading and/or reloading device in which the features of the present invention are embodied; and FIG. 2 is an enlarged fragmentary view of the charge metering and head sections of the device depicted in FIG. 1; but with the head section in a lowered operative position; and FIGS. 3 and 4 are sectional views of the charge metering unit, or charging bar, component of the device shown in FIG. 1 without the features of the present invention; and FIG. 5 is an exploded perspective view of two sets of charge metering means constructed in accordance with a preferred form of the present invention; and FIGS. 6, 7 and 8 are schematic sectional views depicting the variable charge metering aspects obtained by use of the present invention in operative association with the charge metering unit, or charging bar, component of the device.

In further reference to the drawings, FIG. 1 depicts a conventional and well-known, hand-operable type of small-arms shell or cartridge loading and/or reloading device. The device shown in FIG. 1 is, of course, merely characteristic of one of many types of shell or cartridge loading and/or reloading devices particularly suitable for use in conjunction with the present invention. Similar devices, among others, are also shown and disclosed in U.S. Patent Nos. 3,105,408 and 3,157,086. Accordingly, although the structural features depicted in FIG. 1 are considered to be generally conventional and well-known, a brief description of various structural components thereof is hereinafter set forth for the purpose of lending better understanding of the functional and structural compatibility of the invention with such well-known devices.

The illustrated device, as shown, generally includes, among its principal structural members, a base 10 upon which to support the device in operative upright position. In upright position upon the base 10, there is a rigid pedestal 10a upon which a stationary platform is mounted having a horizontally disposed workbed 11. Centrally mounted on the workbed 11, there is a rigid upright column which, in part, functions as a guide post 12 for a movable platform, or head 13, slidably journaled thereon in overlying relationship with the workbed 11. The head 13 is operative, during the course of operation of the device, to be sequentially raised and lowered on the guide post 12 and thereby shift a series of marginally spaced tools, carried thereon in depending relationship and designated generally as 14, 15, 16 and 17, into and out of operative positions in overlying registered alignment with counterpart work stations provided respectively at locations 14a, 15a, 16a and 17a in spaced marginal array on the workbed 11. Located in horizontally spaced vertical alignment with the guide post 12 and implementing the guiding function thereof, there is a spring-loaded guide column 18 which is mounted in upstanding position on the workbed 11 and slidably journaled through a vertical guideway extending through the rearward portion of the head 13. Nested around the guide column 18 and sandwiched between the head 13 and the workbed 11, there is a yieldable compression spring 20 which is arranged to yieldably and resiliently oppose descending movement of the head 13 towards the workbed 11. Downward forcible movement may be imparted manually to the head 13 by means of a manually operable lever arm 19 centrally connected to the head through a pivot connection and fastened endwise through a linking section 19a to the stationary lower portions of the device.

Means are provided above the head 13 for metering and measuring precise quantities of charge, such as powder and/or shot, for delivery to a shell or cartridge. Such means are carried upon an elevated platform 21 which is stationarily secured above the head 13 upon the guide post 12 and the spring-loaded guide column 18. The charge metering and measuring means includes an inverted generally U-shaped slide housing 22 of hollow open-ended construction and comprising front and back walls 22a and 22b arranged in spaced parallel relationship and mutually interconnected by a top wall 22c. Slidably housed within the slide housing 22, there is a charging bar 23 in which, as shown in FIG. 3, charge metering or measuring chambers 23a and 23b are provided which have precisely determined volumetric measuring capacities. In customary manner, one of the measuring chambers, herein designated as 23a, functions as a powder measuring chamber, whereas the other measuring chamber, herein designated as 23b, functions as a shot measuring chamber.

Supported in inverted position above the slide housing are containers 24 and 25, respectively, for containing and delivering separate supplies of powder and shot to the charging bar 23 through spaced filling openings 22d and 22e extending transversely through the top wall 22c of the slide housing at locations registering with the path of slidable movement of the charging bar measuring chambers 23a and 23b within the slide housing. In correlated manner, the elevated platform 21, upon which the charging bar 23 is slidably supported, defines a transverse discharge opening, as at 21a, located in underlying registered alignment with the path of guided slidable movement of the measuring chambers 23a and 23b within the confines of the slide housing 22. The relative orientation of the measuring chambers 23a and 23b, the filling openings 22d and 22e, and the discharge opening 21a is maintained by means of the cooperative relationship of a lateral mounting flange 22f extending laterally outward from the back wall 22b of the slide housing and having a bolt 26 and locator pin 27 associated therewith for securing the slide housing 22 in properly oriented and bolted position upon the platform 21. When so positioned, the correlation between the measuring chambers, the filling openings and the discharge opening is such that when, as shown in FIG. 3, the charging bar 23 is shifted within the slide housing 22 to a position wherein the powder measuring chamber 23a is located in communicating registry with the powder filling opening 22d, the shot measuring chamber 23b will simultaneously assume a position in communicating registry with the discharge opening 21a. Conversely, as shown in FIG. 4, when the shot measuring chamber 23b is positioned in communicating registry with the shot filling opening 22e, the powder measuring chamber 23a will be disposed in communicating registry with the discharge opening 21a. Assurance of proper registration of the powder filling openings 22d and 22e with the powder and shot metering and measuring chambers 23a and 23b, as well as between the latter and the dispensing opening 21a, is achieved by means of a manually operable indexing pin 28 secured, as by threaded engagement, into the side of the charging bar and extending through a side wall slot, as at 22g, in the front wall 22a of the slide housing. The slot 22h having closed opposite ends thereby provides slide stops against which the indexing pin 28 will abut and index the charge measuring chambers in the alternative desired communicating registry described above.

In manner of operation, the indexing pin 28 is moved to the extreme right end of the slot whereat the powder measuring chamber 23a will be filled with powder gravitating through the powder filling opening 22d. Thereafter, the charging bar 23 is slidably shifted within the slide housing 22 sufficiently to bring the indexing pin 28 into abutment with the opposite closed end of the side wall slot 22g, whereat the shot measuring chamber will assume a position in communicating registry with the shot filling opening 22e and be filled with shot gravitating therethrough. Concurrent with the filling of the shot measuring chamber, the powder measuring chamber will assume a position in a communicating registry with the discharge opening 21a and empty the powder contents through a hollow depending delivery tube 29 carried beneath the discharge opening 21a and emptying downwardly into the hollow interior confines of a shell or cartridge (not shown) positioned with its open end in communicating relationship with the discharge end 29a of the delivery tube.

Subsequent to the placement of the powder in the shell or cartridge casing, pelletized shot may be likewise delivered into the confines of the shell or cartridge casing. The shot loading is accomplished by merely slidably shifting the charging bar 23 within the slide housing 22 an extent sufficiently to return the indexing pin 28 to its initially described position in abutting relationship with the extreme right end of the side wall slot 22g. In the last-mentioned position, the shot measuring chamber 23b will reassume a position in communicating axial registry with the discharge opening 21a and the pelletized shot will consequently be gravitationally discharged from the shot measuring chamber 23b through the discharge opening 21a and through the delivery tube 29 into the open end of a shell or cartridge casing placed beneath and in open-ended communication with the open discharge end 29a of the delivery tube 29. When the shot measuring chamber 23b is indexed into axial registry with the discharge opening 21a, the measuring chamber 23a will, of course, be simultaneously indexed and returned into communicating registry with the powder filling opening 22b and there be filled with another measured supply of powder preparatory to carrying out the next successive shell or cartridge powder filling operation.

Keeping in mind that it is frequently necessary or desirable to alter, change or otherwise vary the quantity or measured amount of shot and/or powder placed in a given shell or cartridge, the present invention provides means whereby incrementally variable quantities of precisely metered powder and shot may be delivered to the shell or cartridge casing and at the same time still employ the advantages of a loading and reloading device of the type described. Moreover, the structural features of the present invention are such that either one or both of the charge measuring chambers 23a and 23b may be quickly and conveniently adapted to measure and/or meter precisely predetermined and incrementally variable quantities of powder and/or shot to a shell or cartridge placed beneath the discharge end 29a of the delivery tube 29. As best observed in FIG. 5, the present invention comprises metering elements particularly adapted for insertion in the charge measuring chambers 23a and 23b of the charging bar. More particularly, one set of such charge metering elements 30 is shown for the powder measuring chamber 23a and a companion set of shot metering elements 31 is shown for the shot measuring chamber 23b. Each of the sets 30 and 31, respectively, includes a crown element 30a and 31a. Adapted to be arranged in stacked array beneath each of the crown elements, respectively, there is a plurality of thin, plate-like, annular powder metering disks 30b and 31b. As illustrated in FIGS. 6–8, the crown element 30a and each of the identically shaped disks 30b are shaped to seat in snugly nested and axially stacked array within the powder measuring chamber 23a. Similarly, the crown element 31a and each of the identically shaped disks 31b are shaped to seat in snugly nested and axially stacked array within the shot measuring chamber 23b.

As illustrated, each of the respective crown elements 30a and 31a, in addition to having an annular configuration, define a frusto-conical, inwardly declining, and upwardly facing rim surface (FIG. 5) which slopes downwardly towards and empties into a central transverse opening. To facilitate stacking of the disks within their respective measuring chambers, each of the respective disks 30b and 31b define parallel, oppositely facing, planer, seating surfaces and each has a central transverse opening adapted to register in axially aligned registry with the central opening in the crown element in its respective set.

The volumetric displacement volume of each of the disks 30b is preferably selected to provide a predetermined incremental volumetric variation within the range of variation most commonly desired by the user. In this regard, it has been determined that an optimum range of sequential variation between about one end two grains avoirdupois of powder is well within the range of incremental measurements ordinarly desired. The variation, of course, will depend to some extent upon the fineness, as well as other physical characteristics, of the particular make or brand of powder being utilized. Similarly, the incremental volumetric displacement volume of each of the slot measuring disks 31b has been determined to be between 1/16 and 1/8 of an ounce. Hence, each of the disks 31b is therefore designed to provide a predetermined incremental volumetric displacement value correlated to provide a variation approximating 1/16 ounce increments.

The volumetric capacity of the powder measuring chamber 23a and the crown element 30a and the slot measuring chamber 23b and the crown element 31a are respectively coordinated so that when the crown elements are inserted in their respective measuring chambers, the resultant volumetric capacity of the respective measuring chambers 23a and 23b will be equivalent to the maximum amount of powder or shot ordinarily needed or desired for a given shell or cartridge. In this respect, the maximum powder and shot measuring capacities of the measuring chambers 23a and 23b are depicted by solid lines in FIG. 8, and, as will be observed, only the crown elements 30a and 31a are nested respectively therein. However, as indicated by broken lines, any variable number of the disks 30b and 31b may be inserted in the respective measuring chambers beneath the crown elements to provide a precise predetermined incrementally variable amount of powder and/or shot measurement.

In the embodiment illustrated, the crown elements 30a and 31a and the disks 30b and 31b have been depicted in a preferred form in which the exterior periphery of each is circular to correspond to the conventional configuration of the measuring chambers 23a and 23b. However, it will be readily apparent that the exterior peripheral configuration of the individual components of the metering sets 30 and 31 may take most any desired configuration in keeping with the configuration of the measuring chamber wherein they are to be inserted for their intended use. Additionally, the individual disks and crown elements of each of the metering sets 30 and 31 may be fabricated from aluminum, plastic, glass or most any other inexpensive, durable and relatively corrosion-resistant material.

Recognizing that in certain instances it may be preferable to employ a lesser total number of individual disks, a preferred alternative construction of the disks 30b and 31b has also been found to be particularly desirable. In such instances, the powder metering set would include with a plurality of disks, such as the disks 30b, described above, having an overall volumetric displacement volume approximating an equivalent of between about two to four grains avoirdupois of powder, an additional powder metering disk having the same peripheral configuration and having a volumetric displacement volume of one-half of the other disks, i.e., a volumetric displacement volume approximating an equivalent of between about one to two grains avoirdupois of powder.

In similar manner, the shot metering set may include together with a plurality of disks 31b, each having a volumetric displacement value equivalent to approximately 1/8 of an ounce of pelletized shot, an additional shot metering disk having the same peripheral configuration and a volumetric displacement value equivalent to approximtely 1/16 of a ounce of pelletized shot.

Using the alternative manner of construction, the overall number of disks required to achieve the desired preciseness of measurement may be substantially reduced, but without an attendant loss in the accuracy of measurement of the charge. As an example of the last-mentioned alternative form of construction, there is set forth below a tabulation of typical charge measurements obtained by the use of the present invention in conjunction with a conventional charging bar of the type described. In Table I, there is set forth measurements obtained using the crown element 30a together with a designated number of disks 30b, each having a volumetric displacement volume equivalent to approximately two grains of powder, and also using, in certain instances, a half-thickness disk having a volumetric displacement volume equivalent to approximately one grain of powder; the exact volume varying depending upon the characteristics of each of five common commercially available brands of powder being measured.

TABLE I

| Disks Used Together With Crown Element | | Various Brands of Commercially Available Powder (Grains Avoirdupois) | | | | |
|---|---|---|---|---|---|---|
| Number of Identical Full Thickness Disks Used | Measurements Where Half-Thickness Disk Also Used (*) | A | B | C | D | E |
| 20 | | 13.0 | 11.3 | 19.3 | 19.6 | 16.1 |
| 19 | * | 14.0 | 12.3 | 20.8 | 21.1 | 17.3 |
| 19 | | 15.0 | 13.2 | 22.3 | 22.6 | 18.6 |
| 18 | * | 16.0 | 14.2 | 23.8 | 24.2 | 19.8 |
| 18 | | 17.0 | 15.1 | 25.3 | 25.7 | 21.1 |
| 17 | * | 18.0 | 16.1 | 26.8 | 27.2 | 22.3 |
| 17 | | 19.9 | 17.0 | 28.3 | 28.7 | 23.6 |
| 16 | * | 20.0 | 18.0 | 29.8 | 30.3 | 24.8 |
| 16 | | 21.0 | 18.9 | 31.3 | 31.8 | 26.1 |
| 15 | * | 22.0 | 19.9 | 32.8 | 33.3 | 27.3 |
| 15 | | 23.0 | 20.8 | 34.3 | 34.9 | 28.6 |
| 14 | * | 24.0 | 21.8 | 35.8 | 36.4 | 29.8 |
| 14 | | 25.0 | 22.7 | 37.3 | 37.9 | 31.1 |
| 13 | * | 26.0 | 23.7 | 38.8 | 39.5 | 32.3 |
| 13 | | 27.0 | 24.6 | 40.3 | 41.0 | 33.6 |
| 12 | * | 28.0 | 25.6 | 41.8 | 42.5 | 34.8 |
| 12 | | 29.0 | 26.5 | 43.3 | 44.0 | 36.1 |
| 11 | * | 30.0 | 27.5 | 44.8 | 45.6 | 37.3 |
| 11 | | 31.0 | 28.4 | 46.3 | 47.1 | 38.6 |
| 10 | * | 32.0 | 29.4 | 47.8 | 48.6 | 39.8 |
| 10 | | 33.0 | 30.3 | 49.3 | 50.2 | 41.1 |
| 9 | * | 34.0 | 31.3 | 50.8 | 51.7 | 42.3 |
| 9 | | 35.0 | 32.2 | 52.3 | 53.2 | 43.6 |
| 8 | * | 36.0 | 33.2 | 53.8 | 54.8 | 44.8 |
| 8 | | 37.0 | 34.1 | 55.3 | 56.3 | 46.1 |
| 7 | * | 38.0 | 35.1 | 56.8 | 57.8 | 47.3 |
| 7 | | 39.0 | 36.0 | 58.3 | 59.3 | 48.6 |
| 6 | * | 40.0 | 37.0 | 59.8 | 60.9 | 49.8 |
| 6 | | 41.0 | 37.9 | 61.3 | 62.4 | 51.1 |
| 5 | * | 42.0 | 38.9 | 62.8 | 64.0 | 52.3 |
| 5 | | 43.0 | 39.8 | 64.3 | 65.4 | 53.6 |
| 4 | * | 44.0 | 40.8 | 65.8 | 67.0 | 54.8 |
| 4 | | 45.0 | 41.7 | 67.3 | 68.5 | 56.1 |
| 3 | * | 46.0 | 42.7 | 68.8 | 70.1 | 57.3 |
| 3 | | 47.0 | 43.6 | 70.3 | 71.5 | 58.6 |
| 2 | * | 48.0 | 44.6 | 71.8 | 73.1 | 59.8 |
| 2 | | 49.0 | 45.5 | 73.3 | 74.6 | 61.1 |
| 1 | * | 50.0 | 46.5 | 74.8 | 76.2 | 62.3 |
| 1 | | 51.0 | 47.4 | 76.3 | 77.6 | 63.6 |
| 0 | * | 52.0 | 48.4 | 77.8 | 79.2 | 64.8 |
| 0 | | 53.0 | 49.3 | 79.3 | 80.7 | 66.1 |

In corresponding manner, there is also set forth an exemplary shot charge table indicative of the variations in shot charge obtainable with the charging bar and wherein, as with the alternative form set forth in respect to Table I, the shot metering set for each measurement given includes the use of the crown element 31a in conjunction with a plurality of full thickness shot metering disks equivalent to ⅛ of an ounce of pelletized shot and a half-thickness shot metering disk equivalent to 1/16 of an ounce of pelletized shot.

TABLE II

| Disks Used Together With Crown Element | | Pelletized Shot (Ounces) |
|---|---|---|
| Number of Identical Full Thickness Disks Used | Measurements Where Half-Thickness Disk Also Used (*) | |
| 11 | | ½ |
| 10 | * | 9/16 |
| 10 | | ⅝ |
| 9 | * | 11/16 |
| 9 | | ¾ |
| 8 | * | 13/16 |
| 8 | | ⅞ |
| 7 | * | 15/16 |
| 7 | | 1 |
| 6 | * | 1 1/16 |
| 6 | | 1⅛ |
| 5 | * | 1 3/16 |
| 5 | | 1¼ |
| 4 | * | 1 5/16 |
| 4 | | 1⅜ |
| 3 | * | 1 7/16 |
| 3 | | 1½ |
| 2 | * | 1 9/16 |
| 2 | | 1⅝ |
| 1 | * | 1 11/16 |
| 1 | | 1¾ |
| 0 | * | 1 13/16 |
| 0 | | 1⅞ |

In order to provide a form of readily ascertainable recognition of the half-thickness disk, it may be preferred to provide the half-thickness disk in each set with an appearance, such as by color, or otherwise, which is readily distinguishable from the full thickness disks in each set. One such manner of distinction is to fabricate the full thickness from steel and to fabricate the half-thickness disk from brass whereby the brass and steel disks are readily discernible by the difference in the color.

Moreover, it will, of course be further understood that various other details of construction may be modified throughout a wide range of equivalents, and it is not, therefore, the purpose to limit the scope of the present invention otherwise than as may be necessitated by the scope of the appended claims.

I claim:

1. For use in combination with a shell or cartridge loading device having means defining at least one hollow charge measuring chamber therein in which to measure and deliver successive charges into a hollow shell or cartridge, charge metering means comprising at least one set of charge metering elements, each of said charge metering elements being peripherally shaped to snugly nest in axially stacked array within said charge measuring chamber, each of said charge metering elements having a volumetric displacement capacity corresponding to a predetermined incremental portion of the volumetric charge measuring capacity of said charge measuring chamber, and each of said charge metering elements being removably insertable in said charge measuring chamber for selectively and incrementally varying the volumetric charge measuring capacity of said charge measuring chamber.

2. Charge metering means, as defined in claim 1, wherein said set is provided with a crown element defining a downwardly and inwardly inclined continuous rim surface leading to a centrally defined opening extending transversely therethrough.

3. Charge metering means, as defined in claim 2, wherein said set further includes a plurality of thin annular disks arranged to seat in axially stacked array beneath said crown element.

4. Charge metering means, as defined in claim 3, wherein said thin annular disks are peripherally identical in shape and size and respectively define a peripheral configuration coinciding with the peripheral configuration of said crown element.

5. Charge metering means, as defined in claim 4, wherein at least one of said thin annular disks has a volumetric displacement capacity within said charge measuring chamber equivalent to between about one and two grains avoirdupois of powder.

6. Charge metering means, as defined in claim 4, wherein at least one of said thin annular disks has a volumetric displacement capacity within said charge measuring chamber equivalent to about one-sixteenth of an ounce of pelletized shot.

7. For use in a shell loading device, as defined in claim 1, wherein said charge metering means defines two hollow charge measuring chambers therein, one of said pair of hollow charge measuring chambers being powder measuring chamber and the other of said charge measuring chambers being a pelletized shot measuring chamber, said powder measuring chamber and said shot measuring chamber being cooperatively deployed to sequentially measure and deliver powder and pelletized shot to said shell or cartridge, two sets of charge metering means, each of said sets comprising an annular frusto-conical crown element having an inwardly and downwardly inclined rim surface leading to a central opening extending therethrough, one of said sets comprising a plurality of identical thin annular disks shaped to nest together with one of said crown elements in axially stacked array within said powder measuring chamber, the other of said sets also comprising a plurality of identical thin annular disks shaped to nest together with the other of said crown elements in axially stacked array within said pelletized shot measuring chamber, said thin annular disks of each set being individually removably insertable in said respective measuring chambers for selectively and incrementally varying the volumetric charge measuring capacity of said powder and said pelletized shot measuring chambers.

8. Charge metering means, as defined in claim 7, wherein at least one thin annular disks of one of said sets corresponds to a volumetric displacement within said powder measuring chamber equivalent to between one and two grains avoirdupois of powder, and wherein at least one of said thin annular disks of the other of said sets corresponds to a volumetric displacement within said pelletized shot measuring chamber equivalent to one-sixteenth of an ounce of pelletized shot.

9. Charge metering means, as defined in claim 8, wherein the remainder of said thin annular disks of said first-mentioned set correspond to a volumetric displacement within said powder measuring chamber equivalent to between two and four grains avoirdupois of powder, and wherein the remainder of said thin annular disks of said other mentioned set correspond to a volumetric displacement within said pelletized shot measuring chamber equivalent to one-eighth of an ounce of pelletized shot.

10. Charge metering means, as defined in claim 4, wherein said thin annular disks cooperate together to provide an incrementally variable volumetric displacement capacity within said charge measuring chamber which is variable in increment equivalent to between one and two grains avoirdupois of powder charge.

11. Charge metering means, as defined in claim 4, wherein said thin annular disks cooperate together to provide an incrementally variable volumetric displacement capacity within said charge measuring chamber which is variable in increments equivalent to about one-sixteenth of an ounce of pelletized shot.

12. For use in combination with a shell loading device having means defining a hollow powder measuring chamber and a hollow pelletized shot measuring chamber in which to sequentially receive and deliver charges of powder and pelletized shot into the interior confines of a hollow shell or cartridge, charge metering means comprising a set of annular powder metering elements peripherally shaped to snugly nest in axially stacked array within said powder measuring chamber, said charge metering means also comprising a set of shot metering elements peripherally shaped to snugly nest in axially stacked array within said pelletized shot measuring chamber, each of said powder and said shot metering elements having a volumetric displacement capacity corresponding respectively to a predetermined incremental portion of the volumetric measuring capacity of said powder and said pelletized shot measuring chambers, each of said powder and said shot metering elements being individually removably insertable respectively in said powder and said pelletized shot measuring chambers, whereby the volumetric measuring capacity of each of said measuring chambers may be selectively and incrementally varied by said metering elements to correspond to desired volumetric variations in the amount of charge to be delivered to a shell or cartridge.

13. Charge metering means as defined in claim 1, wherein said charge metering elements individually define an annular configuration and respectively have an annular volumetric displacement capacity corresponding to a fixed predetermined incremental portion of the volumetric charge measuring capacity of said charge measuring chamber.

14. Charge metering means as defined in claim 1, wherein said charge metering elements individually define an annular configuration and provide an opening accommodating the passage of charge therethrough between opposite ends of said charge measuring chamber.

15. Charge metering means as defined in claim 1, wherein said charge metering elements are gravitationally insertable in said charge measuring chamber.

References Cited

UNITED STATES PATENTS

| | | | |
|---|---|---|---|
| 272,072 | 2/1883 | Michaelis | 73—429 X |
| 629,120 | 7/1899 | Barlow | 86—33 |

BENJAMIN A. BORCHELT, *Primary Examiner.*

P. A. SHANLEY, *Assistant Examiner.*